United States Patent [19]
Middleton

[11] 3,894,805
[45] July 15, 1975

[54] MOUNTING APPARATUS AND SYSTEM FOR LASER SURVEYING INSTRUMENT

[75] Inventor: Robert O. Middleton, Palo Alto, Calif.

[73] Assignee: Equipment Guide Book Company, Palo Alto, Calif.

[22] Filed: Dec. 26, 1973

[21] Appl. No.: 428,620

[52] U.S. Cl. ............... 356/138; 356/153; 356/249; 33/290
[51] Int. Cl. .......................................... G01b 11/26
[58] Field of Search .................. 356/138, 153, 249; 331/DIG. 1; 33/1 DD, 290

[56] References Cited
UNITED STATES PATENTS

| | | | |
|---|---|---|---|
| 3,279,070 | 10/1966 | Blount et al. | 33/275 R |
| 3,588,255 | 6/1971 | Alexander | 356/153 |
| 3,612,700 | 10/1971 | Nelson | 356/153 |
| 3,631,601 | 1/1972 | McNulty | 356/153 |

Primary Examiner—Ronald L. Wibert
Assistant Examiner—Paul K. Godwin
Attorney, Agent, or Firm—Julian Caplan

[57] ABSTRACT

A clamp suitable for attachment to a pipe or column is connected to the housing of a laser surveying instrument with adjustment means for horizontal rotation about a vertical axis and independent rotation about a horizontal axis. A micrometer adjustment sets the angle between the level vial and the optic axis so that the laser beam can be set at a desired percent of grade by means of the bubble level. This is particularly useful in establishing the grade of pipes and conduits. The column may be fixed in position in a variety of ways. One means is to support the column as the "fourth leg" of a surveyor's tripod. Another is to support the column on a plate or any firm support with a screw jack extension compressed against a horizontal surface such as the top of a pipe. Another means employs an extensible compression bar which engages the walls of a manhole. The column is clamped to the compression bar. As a modification of the last-mentioned means, the bottom of the column on which the laser is clamped rests on a threaded post in a plate resting on the bottom of the manhole. By using the threaded post as a jack; the assembly may be rigidly held between the three contact points. Since the instrument is usually removed for overnight storage, a second clamp may be attached to the column to provide a reference surface for resetting the laser in its original position. When the instrument is replaced, the second clamp insures that the elevation and direction of the instrument are the same as on the previous day.

12 Claims, 19 Drawing Figures

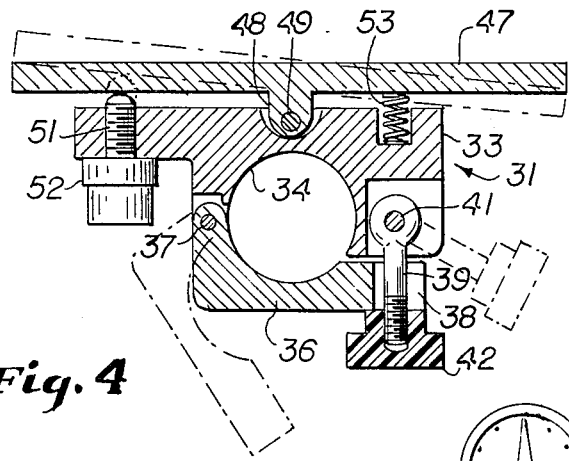
Fig. 4
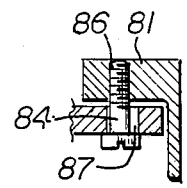
Fig. 6
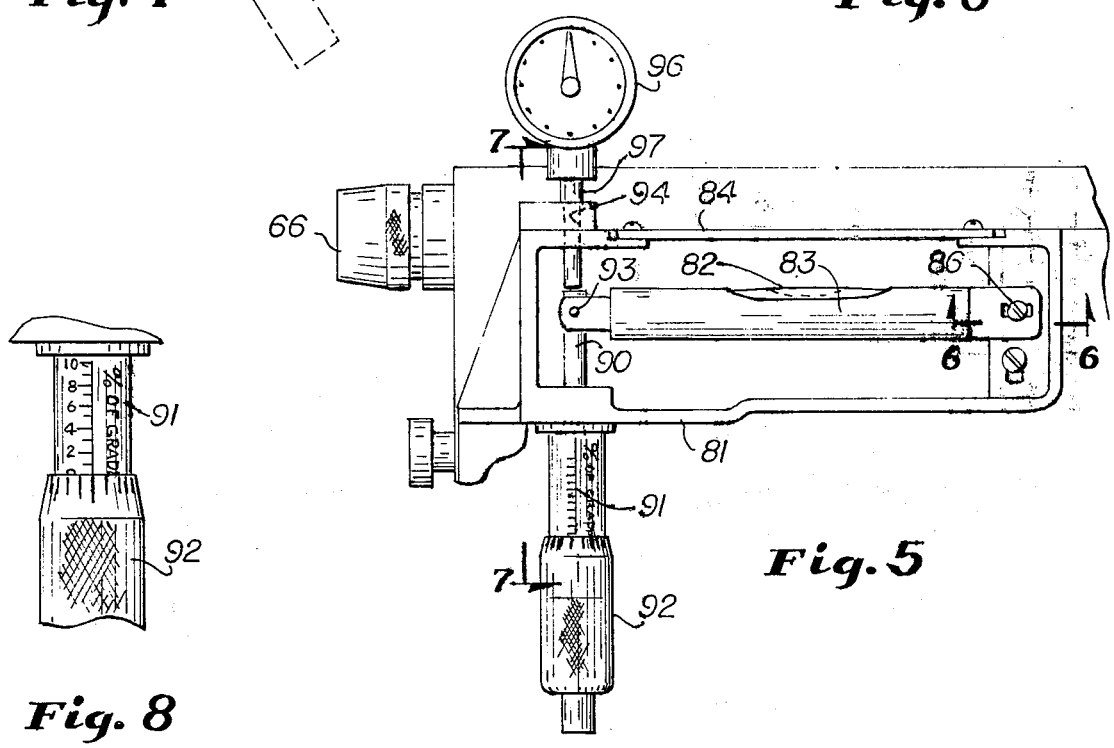
Fig. 5
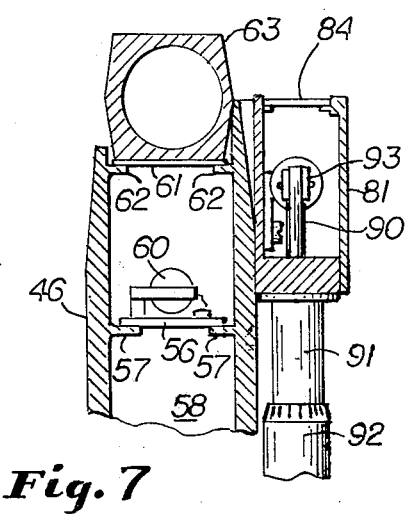
Fig. 8
Fig. 7
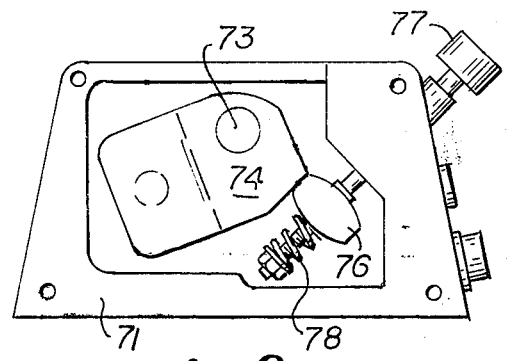
Fig. 9

MOUNTING APPARATUS AND SYSTEM FOR LASER SURVEYING INSTRUMENT

This invention relates to a new and improved mounting apparatus and system for laser surveying instruments. More particularly, the invention provides an instrument which emits a laser beam indicating grade and direction. The instrument is accurate, easy to use, and is capable of being employed in a wide variety of field installations. A principal purpose of the present invention is in the surveying of pipelines. The instrument provides a stable reference beam at a pre-selected per cent of grade or slope.

A principal advantage of the present invention is that it may be used in construction projects to provide a line and grade reference visible at long distances and which does not interfere with the movement of men, materials and equipment.

Another advantage of the invention is that a micrometer adjustment is provided which reads directly in per cent of grade.

Another feature of the invention is the fact that the instrument can be clamped to a column or pipe. By means of the clamp, a rough adjustment for height and angle about the axis of the pipe is provided. The instrument has fine adjustment for the angle about the axis of the column and also for adjustment about a horizontal axis transverse to the axis of the column.

A particular feature of the invention is the fact that the instrument may be attached to a column in a variety of different installations. Among the various means of support of the instrument is a column which comprises a "fourth leg" of a surveyor's tripod. The column fits through a sleeve in the top of the tripod, the sleeve being adjusted by means of telescoping legs on the tripod so that the axis of the column is vertical. The bottom of the column preferably has a point for setting firmly into the ground or concrete. The column is offset a predetermined distance relative to the centerline of the pipe to be laid in order to bring the optical axis of the laser to the working position. A template may be employed which accurately sets the column for such distance. The column includes extension section so that the instrument may be installed above the tripod at varying elevations.

Since a principal use of the present invention is in the laying of pipe, means is also provided for installing the instrument at various locations in manholes and pipes. One means for such installations is the mounting of a column extending perpendicular to a plate which rests on the bottom of the pipe. Leveling screws and bubble indicators may be attached to the plate to insure that it is horizontal and hence that the column which supports the instrument is vertical. Further, to insure that the plate remains in position, the column may be provided with a screw jack extension, preferably having a point which may be forced to embed itself into the top of the pipe to form a rigid mounting for the column.

Still another means for mounting the column is the use of an extensible compression bar which extends transversely to the column and is clamped thereto. The compression bar is expanded by means of a screw jack so as to firmly engage the walls of a manhole, e.g. and the column is suspended therefrom. The instrument is attached to the column at various locations such as directly opposite the opening through which a pipe being laid extends. As a further feature of this method of installation, the point on the end of the column may engage a threaded jack attached to a plate which rests on the bottom of the manhole or the bottom of the pipe to which it is attached. After the clamps have been adjusted, the jack is turned to jam the column and compression bar accurately in position, thereby providing a rigid assembly which is not easily dislodged by men entering the manhole, nor jarred out of adjustment by movement of heavy equipment in the near vicinity.

It is usually desirable to remove the instrument for storage in a safe place at night. To facilitate a replacement of the instrument in the precise position it occupied prior to removal, means is provided comprising a second clamp which fits on the column beneath or above the instrument clamp and thus determines the vertical position of the instrument. The second clamp is provided with a pin which engages a shoulder on the instrument clamp and hence determines the angle of the instrument about the axis of the column. Accordingly, the instrument may be unclamped from the column at the end of a shift, stored, and then replaced the next day with the instrument accurately positioned.

It is another feature of the invention that a target may be installed in the pipeline at a distance from the instrument having an area thereon of reflective material. A mirror is fastened to the instrument and held at an angle allowing the observer to look up the pipeline. The laser beam reflects back from the target to the mirror and thence to the eye of the observer to indicate whether the beam is accurately on target. As a further modification of this improvement of the invention, a second mirror may be attached on the column which supports the instrument at a distance therefrom and likewise disposed at an angle so that the viewer's eye can observe the position of the laser beam relative to the target without bending to an awkward position.

Other objects of the present invention will become apparent upon reading the following specifications and referring to the accompanying drawings in which similar characters of reference represent corresponding parts in each of the several views.

In the drawings:

FIG. 4 is an enlarged vertical sectional view taken substantially along the line 4—4 of FIG. 1.

FIG. 5 is a fragmentary enlarged sectional view of the micrometer adjustment portion of the machine with parts removed to reveal internal construction.

FIG. 6 is a fragmentary sectional view taken substantially along the line 6—6 of FIG. 5.

FIG. 7 is a sectional view taken substantially along the line 7—7 of FIG. 5.

FIG. 8 is an enlarged fragmentary elevational view showing the markings on the barrel of the micrometer.

FIG. 9 is an enlarged fragmentary elevational view of the adjustment of the instrument about a horizontal axis.

Figure 1:
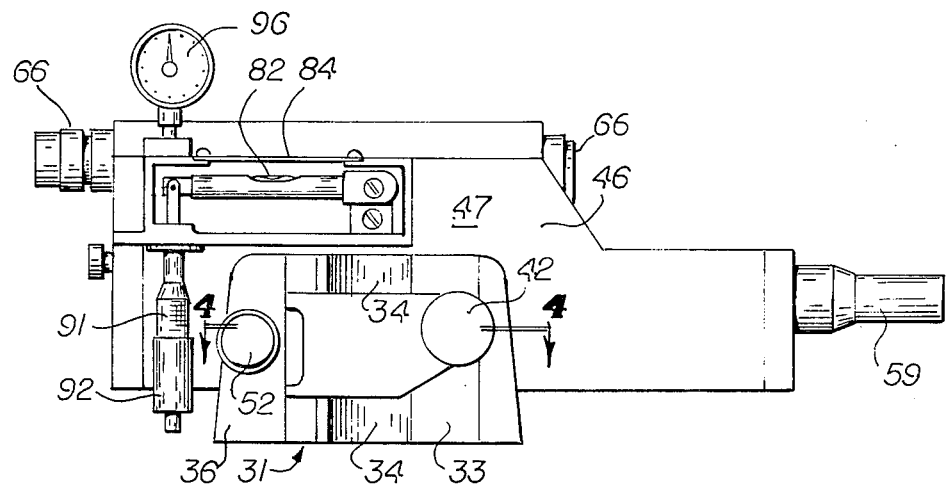
FIG. 1 is a side elevational view of the instrument showing the clamp open.
Figure 2:
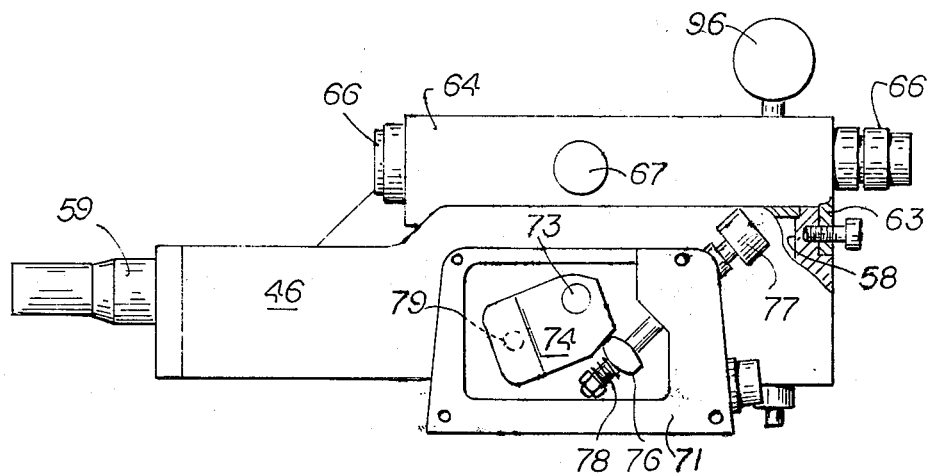
FIG. 2 is a view similar to FIG. 1 from the opposite side of the machine partly broken away in section.
Figure 3:
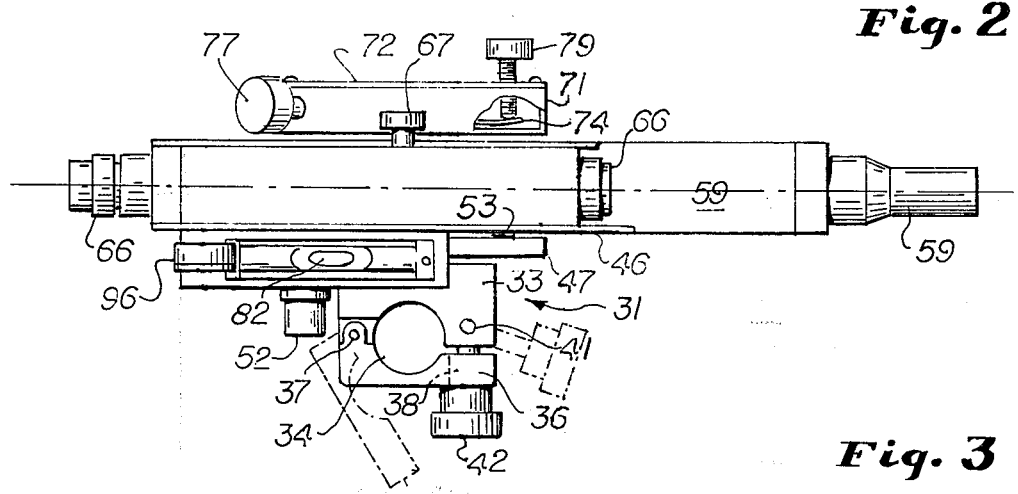
FIG. 3 is a top plan view thereof.

Clamp 31 is used to attach the instrument to a column or pipe 32 which is, in turn, supported in a variety of ways as hereinafter explained. Clamp 31 comprises a body 33 formed with a semi-circular groove 34 at top and bottom having a radius of curvature which preferably is the same as the exterior of the column 32 or is designed to provide 3 spaced line contacts which clamp 31 rigidly to 32. A swing member 36 similarly grooved is attached to body 33 by means of a hinge 37 which in normal use of the device has a vertical axis. On the opposite side of member 36 from hinge 37 bifurcations 38 are formed and a screw 39 is attached to body 33 by means of a pivot 41. Nut 42 is threaded onto screw 39 and is used to swing the screw 39 between the bifurcations 38 and clamp the clamp 31 onto the column 32.

Casing 46 is provided with a side plate 47 adjacent clamp 31. As is shown in FIG. 4, ears 48 project from plate 47 and are pivoted to clamp body 33 by means of pivot 49. Screw 51 is threaded into body 33 and bears against plate 47. On the side of pivot 49 opposite screw 51 are springs 53 recessed into body 33 and also bearing against plate 47. By turning screw 51, the angle of plate 47 relative to clamp 31 may be adjusted. It will be understood, therefore, that preliminarily, the clamp 31 is positioned along column 32 in the desired vertical position and before the nut 42 is tightened, the casing 46 is directed approximately in the direction desired for the laser beam. A fine adjustment is obtained by screw 51. Once this adjustment has been attained, locknut 52 is tightened holding the plate 47 at the desired angle. Spring 53 insures that the plate is properly positioned.

Casing 46 is provided with a horizontal partition 56 which fits on flanges 57 to close off a cavity 58 below partition 56 in which the laser instrument 59 is installed. The details of laser instrument 59 form no part of the present invention and are not here illustrated or described in detail. By way of example, a helium-neon element having an output of between 2.5 and 3.5 milliwatts and provided with a collimating scope to provide a beam of approximately ⅜ inch diameter and having a range of several thousand feet is preferred. Located above partition 56 are various electronic components 60 of the circuit within a cavity above partition 56. The casing 46 is closed off by top plate 61 which rests on flanges 62. Front and rear scope mounting brackets 63, 64 are attached above plate 61 and support a telescope 66 which may be focused by means of knob 67, as best shown in FIG. 7.

As best shown in FIG. 9, a hollow housing 71 is attached to clamp body 33 on the side of the instrument opposite member 36. A cover 72 is detachably secured to the side opening of housing 71. The casing 46 is pivoted to housing 71 by means of a horizontal hollow spindle 73. Fixed for rotation with spindle 73 and within housing 71 is a brass plate 74 which is fixed to a nut 76. In threaded engagement with nut 76 is a tangent screw 77 which extends from the exterior of housing 71 into the interior thereof and carries beyond nut 76 a spring 78. By turning the exterior knob on screw 77, the horizontal adjustment of casing 46 about the axis of spindle 73 may be accurately adjusted. Once properly adjusted, lockbolt 79 which is threaded into cover 72 engages brass plate 74 and locks the parts into position.

An important feature of the invention is the fact that the laser beam emitted from instrument 59 may be set at a per cent of grade. For such purpose, there is provided a hollow housing 81 on the side of casing 46 opposite housing 71 and best shown in FIG. 5. Within housing 81 is a glass vial 82 having an air bubble and retained within a vial holder 83 and visible from above through a transparent plate 84 which closes off the top of housing 81. Vial holder 83 is pivoted to housing 81 by means of horizontal pivot 86 which fits through an elongated slot 87 in the holder 83. There is a micrometer adjustment for the position of vial 82, the details of which are not shown herein since the structure is a modification of a commercially available micrometer. The micrometer barrel 91 fits through an opening in the bottom of housing 81 and is secured therein. The movable extension 90 of thimble 92 is attached by means of pin 93 to the end of vial holder 83 opposite pivot 86. The micrometer barrel 91 is fixed and the thimble 92 turns relative thereto and extends and retracts the extension 90. Extension 90 is fixed for vertical movement. Since the vial holder 83 must slant upward and downward relative to the horizontal, the holder 83 assumes the position of the hypotenuse of a right triangle, and this is the reason that the pivot 86 extends through an elongated slot 87 in the holder 83. If desired, a dial indicator 96 having a stem 97 fitting through an opening 94 in the top of housing 91, engages the top of the extension 90. Hence, the indicator 96 may be read as an alternate to the vernier markings on the barrel 91 and thimble 92.

By adjustment of thimble 92 the per cent of grade indicated in FIG. 8 is selected. This may be either a negative or positive grade depending upon the job installation. A typical setting at zero grade is shown in FIG. 8. With the adjustment set on the micrometer the screw 77 is turned until the bubble of the vial 82 is viewed through the window 84 is centered. The beam of the laser instrument 59 is now at the desired per cent of grade.

The clamp 31 may be fastened onto a column 32 in a variety of different environments, as has heretofore been explained. Directing attention first to FIG. 10 and FIG. 11, a tripod 101 is illustrated, it being understood that the details of construction are subject to wide variation and any commercially available surveyor's tripod may be adapted to the present invention. Tripod 101 has three legs 102 which are attached by means of horizontal pivot 103 to a table 104 at the top of the tripod.

Figure 10:
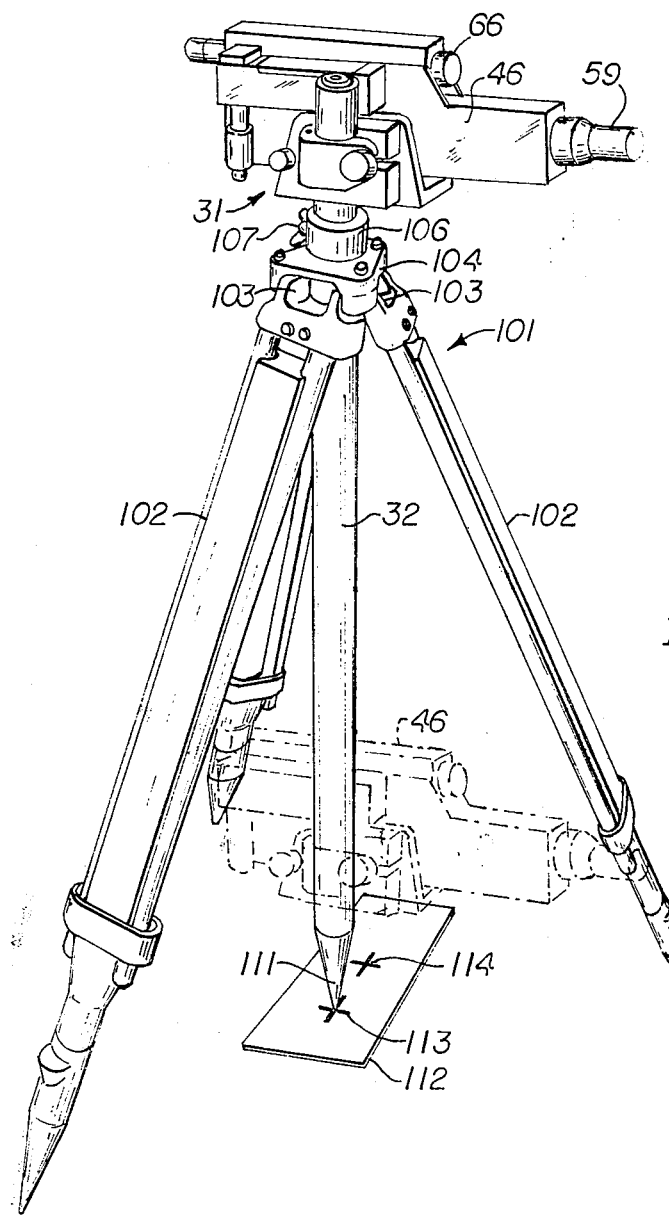
FIG. 10 is a perspective view showing the instrument installed on a rod held as the fourth leg of a surveyor's tripod.

Although not illustrated herein, instrument 46 may be attached to a mating platform which is connected to table 104 by leveling screws (not shown) in the same manner as a transit or level may be attached to the table of a surveying tripod. In a form of the present invention, however, a ring 106 is fixed to table 104 and receives the column 32. The column 32 is clamped relative to ring 106 by means of clamp nut 107. As is shown in FIG. 10 in solid lines, instrument 46 may be clamped by means of clamp 31 to column 32 at any position above ring 106. As shown in dot-and-dash lines in FIG. 10, the instrument 46 may be clamped by means of clamp 31 to any position on column 32 below table 104 depending upon the job conditions.

It is apparent from FIG. 10 that the column axis 32 is offset laterally relative to the axis of laser 59 by a predetermined fixed distance. A template 112 may be positioned on the ground and a point 111 on the bottom of column 32 be located on a marking 113. The marking 113 is a fixed distance from marking 114 which is equal to the distance between the vertical axis of column 32 and the horizontal axis of laser instrument 59 measured in a horizontal plane.

In use, the table 104 is adjusted so that it is horizontal. Column 32 is elevated at the time of the adjustment of legs 102 but after they are properly adjusted, the nut 107 is loosened allowing the point 111 to engage the ground whereupon the clamp nut 107 is tightened. The column 32 thereafter functions as the fourth leg of tripod 101. Where template 112 is used, the marking 113 is a hub point in the surveying by means of instrument 59. Clamp 31 is tightened on column 32 in the desired elevation and the adjustments which have heretofore been described are made so that the beam of the laser 69 is directed at a proper elevation and direction. The elevation of the beam may be horizontal or it may be at a desired per cent of grade, all as has heretofore been explained.

Figure 11:
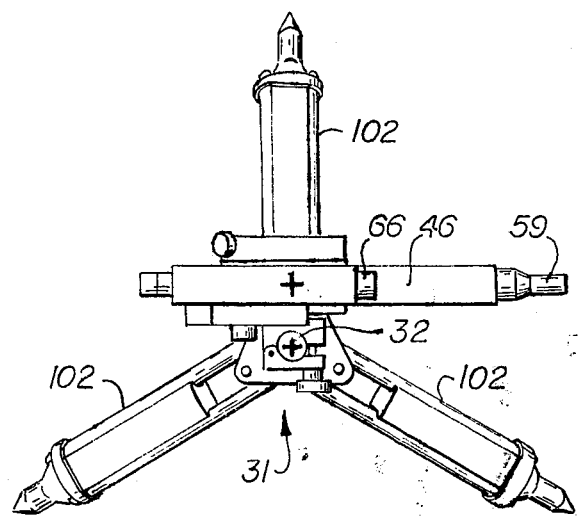
FIG. 11 is a top plan view of the structure of FIG. 10.
Figure 12:
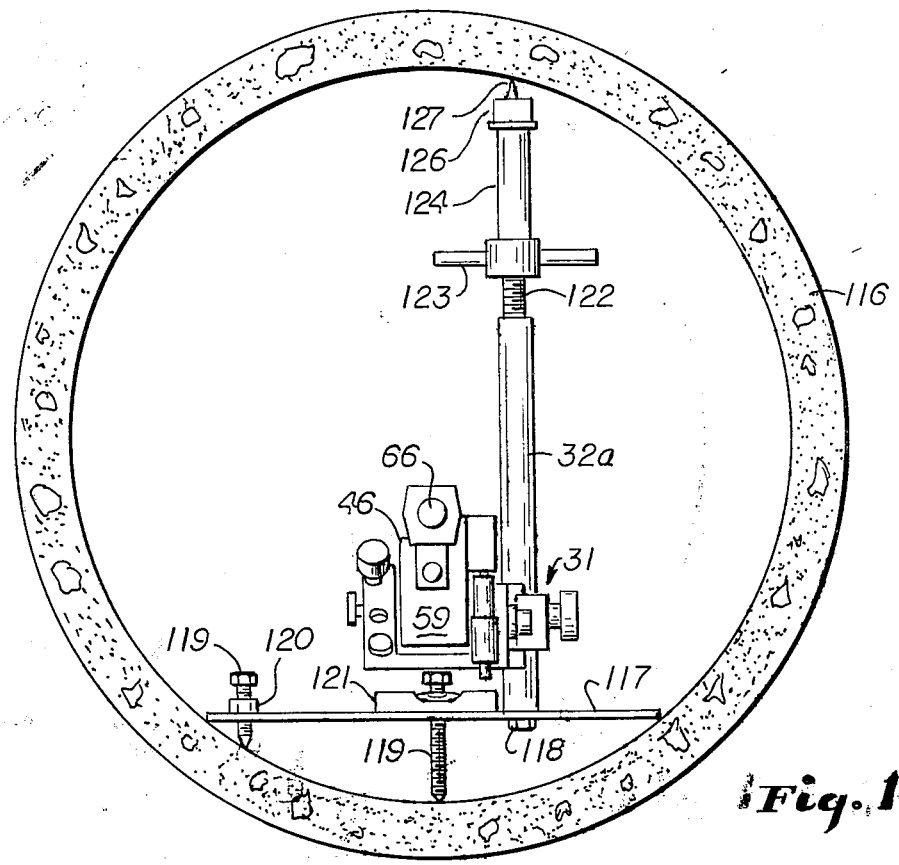
FIG. 12 is a sectional view showing the instrument installed on a rod extending from a plate on the bottom of a pipe.
Figure 13:
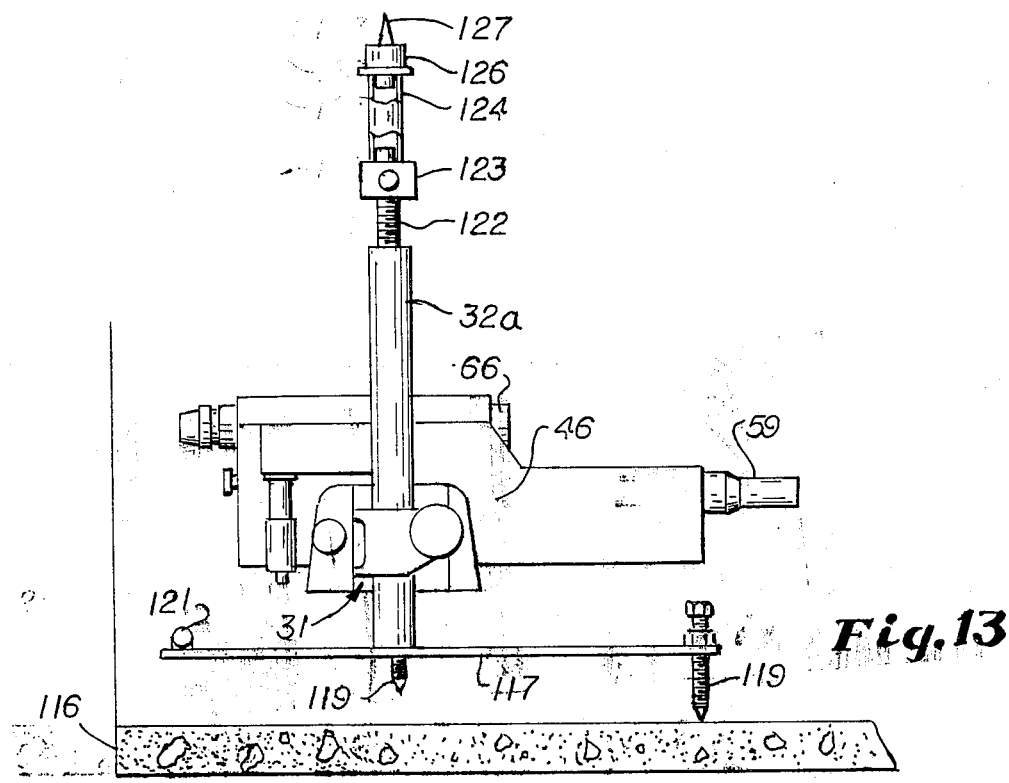
FIG. 13 is a side elevational view of the structure of FIG. 12.

FIGS. 12 and 13 illustrate still another support for the casing 46. In this installation, a large diameter pipe 116 furnishes the support for a horizontal plate 117. The vertical column 32a is attached to plate 117 by bolt 118, by welding or other means. A number of adjustment screws 119 are threaded through plate 117 or nut 120 welded thereto and bear against the bottom walls of the pipe 116. Spirit levels 121 fixed to plate 117 are used to check the horizontal positioning of the plate, and hence the vertical positioning of column 32a. To further rigidly secure the assembly, a screw jack 122 is fixed to the upper end of column 32a and is in threaded engagement with a hand turning nut 123 which bears against pipe extension 124 which has a cap 126 in its upper end formed with a point 127 which penetrates the pipe 116 and secures the parts in the position shown. The installation of FIGS. 11 and 12 is particularly useful in mounting instrument 46 when the manhole is not in place.

Figure 14:
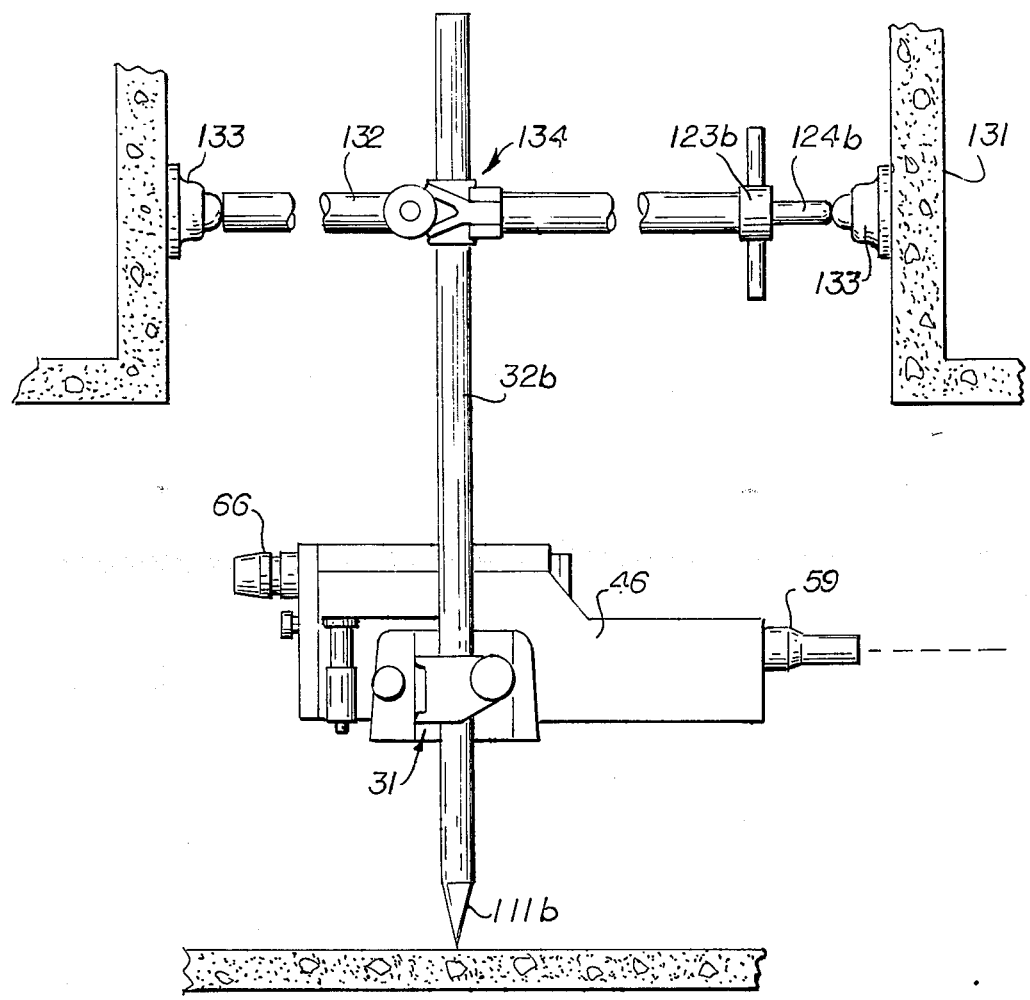
FIG. 14 is a sectional view showing the instrument attached to a column suspended from a compression bar in a manhole.

FIG. 14 illustrates still another installation. A preferred use for the installation of this figure is at the intersection of a manhole 131 with a pipe 116b. The column 32b is supported by a horizontal expansion bar 132 having feet 133 at either end which bear against the walls of the manhole 131. The right-hand foot 133, as viewed in FIG. 14, is attached to the outer end of a screw 124b which is turned by nut 123b so that the expansion bar 132 is firmly jammed within the manhole 131. A clamp 134 similar to that used to clamp metal scaffolding parts together connects column 32b to the expansion bar 132.

Figure 15:
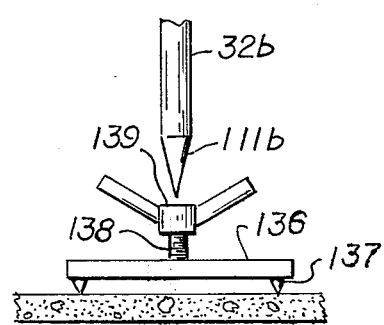
FIG. 15 is a perspective view showing a means for jamming the structure of FIG. 14 into a rigid assembly.

A modification of the structure of FIG. 14 is shown in FIG. 15. In this installation, the bottom of the hole is provided with a foot plate 136 having pointed pins 137 on its bottom which dig into the walls of the pipe or manhole base which supports plate 136. Extending up from plate 136 is a threaded column 138 which receives a nut 139. The point 111b of column 32b fits into a hole in the top of nut 139. When the parts have been assembled as in FIG. 14, the nut 139 is turned in a direction to elevate the same and this forces the column 32b upward slightly and jams the clamp 134 and the expansion bar 132 in such manner as to form a very rigid connection so that the assembly cannot be dislodged by being jarred by personnel contacting the support nor by heavy equipment moving in close proximity to the installation.

Figure 16:
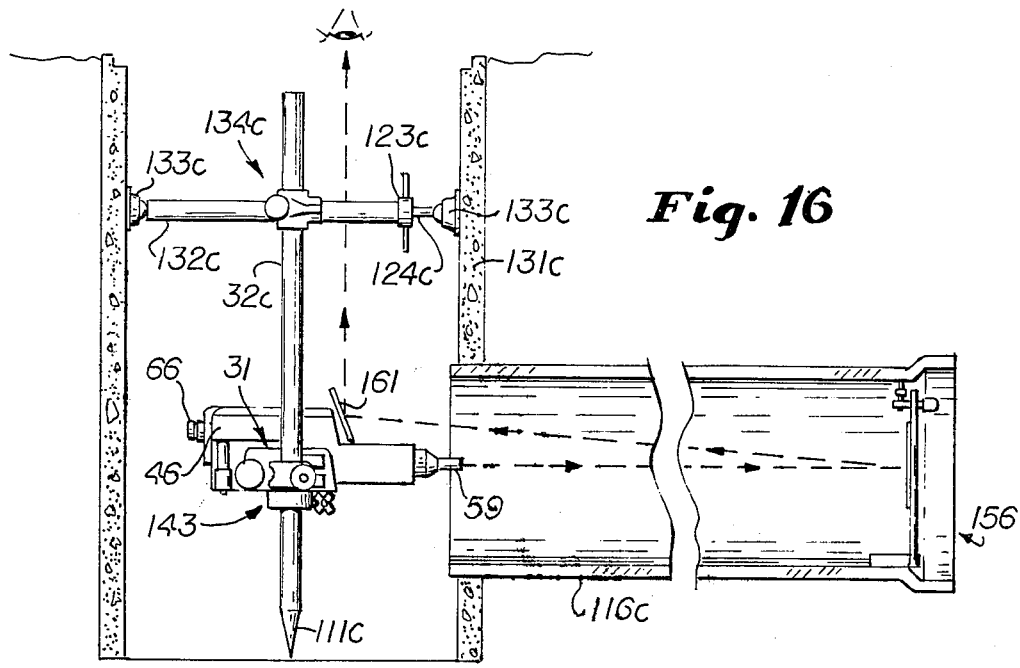
FIG. 16 is a sectional view showing an installation of the device suspended from a manhole and showing a target located at a distance down a pipeline.
Figure 17:
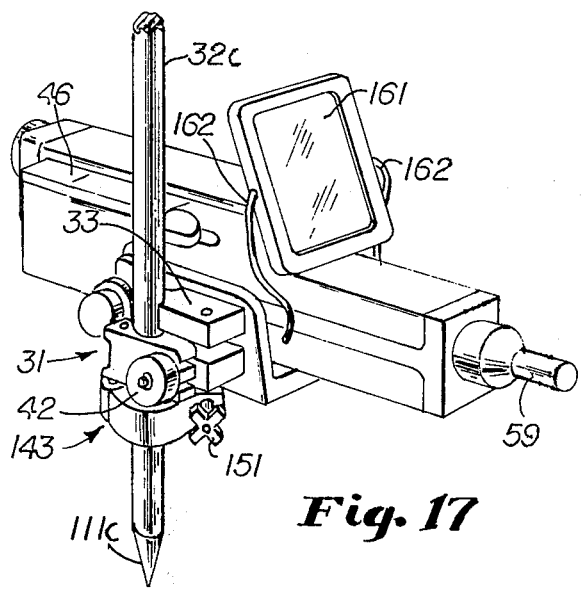
FIG. 17 is a perspective view showing the installation of FIG. 16 with the mirror on the instrument emphasized.
Figure 18:
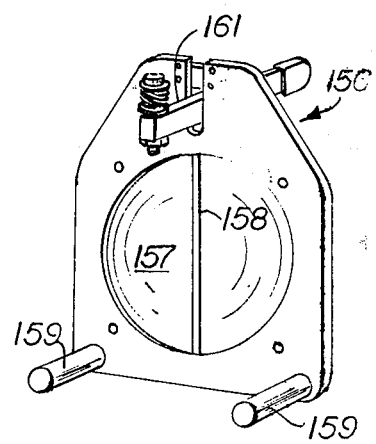
FIG. 18 is a perspective view of the target of FIG. 16.
Figure 19:
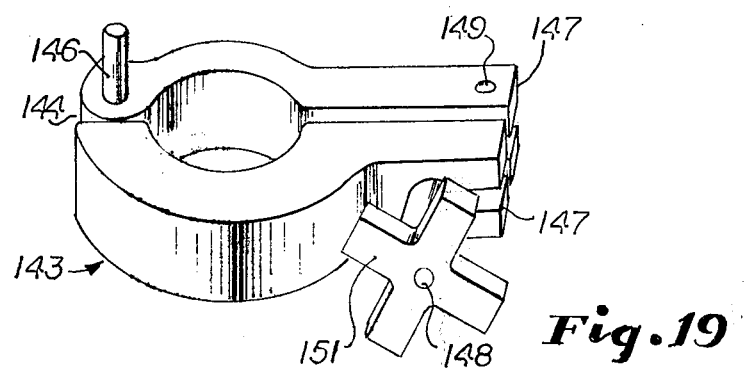
FIG. 19 is a perspective view showing a second clamp which assists in accurately relocating the instrument after it has been removed for overnight storage.

A preferred installation is shown in FIG. 16 wherein the column 32c is attached by means of clamp 134c to an expansion bar 132c against the walls of the manhole 131c. The casing 46 is supported by clamp 31 on the column 32c. However, in this embodiment a locating collar 143 is also clamped to column 32c immediately below (or above) clamp 31 so that the latter contacts the clamp 143 and the clamp 143 determines the vertical position of casing 46. Collar 143, as best shown in FIG. 19, is split at joint 144 about a vertical hinge pin 146. The opposite ends of collar 143 are elongated and bifurcated as indicated by reference numeral 147. A screw 148 is pivotally attached to one of the bifurcations 147 by means of pivot pin 149. The collar 143, therefore, may be pulled apart to permit its installation on column 32c; and thereupon, the parts are brought together and the screw 148 pivoted to the position of FIG. 19 and nut 151 tightened to hold the parts assembled tightly gripping the column 32c. Hinge pin 146 is elongated above (and below) clamp 143 and bears against a shoulder (not shown) on clamp 31. With the bottom of clamp 31 resting on collar 143 and with the pin 146 in tight contact with the shoulder on clamp 31, instrument 46 is held in one position of adjustment. Thus, at the end of a day, before removing clamp 31, the locating collar 143 is installed in position and left overnight while the clamp 31 around the column 32c with the bottom of the clamp in the same position as previously and with the pin 146 accurately engaging the shoulder in clamp 31.

FIG. 16 shows a further adaptation of the invention. A target 156 is located within pipe 116c at a considerable distance. Such target has a transparent central portion 157 through which laser beam may extend to the next target so that the alignment of the pipe 116c may be checked from time to time. To make sure that the laser beam is centered, a strip of reflective tape 158 is installed on target center 157, preferably vertically. The target may be installed in vertical position by various means. One preferred means well recognized in this art comprises a pair of horizontal pins 159 which rest on the bottom of the pipe and a top adjustment 161 which is adjusted to insure that the target center 157 is vertical. The beam from the laser instrument 59 strikes the tape 158 in part and is reflected back to a mirror 161 which is secured to the instrument casing 46 by means of bindings 162 or other means at a 45° angle. The eye of the observer at the surface looking down on the mirror 161 observes whether the beam from the instrument 59 is illuminating the tape 158 and hence whether the beam is on target.

Many of the elements of the modifications of FIGS. 12–13, 14–15 and 16–19 resemble the elements of the preceding combinations and the same reference numerals followed by the subscripts *a*, *b* and *c*, respectively, are used to designate corresponding parts.

What is claimed is:

1. A laser surveying instrument comprising a housing, a laser beam generator and collimator for extending a laser beam out of said housing, a clamp formed to clamp about a column or pipe, a plate, means connecting said clamp to said plate for relative movement about a vertical axis, means for adjusting the position of said clamp and said plate relative to said vertical axis, means connecting said housing and plate together for controlled relative movement about a first horizontal axis, a bubble vial, means mounting said vial on said housing for relative movement about a second horizontal axis at a first end of said vial, a micrometer mounted on said housing and connected to said vial at a second end opposite said first end, said micrometer having a barrel marked with percent-of-grade indicia to indicate the slope of said generator relative to the horizontal when said vial is horizontal.

2. An instrument according to claim 1 in which said clamp comprises a clamp body formed with a first groove, a swinging member formed with a second groove opposed and parallel to said first groove where said clamp is operative, means pivoting said body and swinging member together about an axis parallel to said grooves, and adjustable means for pulling said body and swinging member together.

3. In combination, an instrument according to claim 2, a cylindrical column adapted to be clamped by said clamp to hold said instrument fixed in place on said column offset from said column by a fixed dimension, and support means for said column.

4. The combination of claim 3 in which said support means comprises a surveyor's tripod having a table apertured to receive said column.

5. The combination of claim 4 in which said cylindrical column is formed with a point at one end and which further comprises a template positioned perpendicular to said column and engaged by said point formed with two marks spaced apart the horizontal distance between the axis of said cylindrical column when held in said clamp and a vertical axis through said laser beam generator.

6. The combination of claim 3 which further comprises a plate, said cylindrical column fixed in position normal to said plate, and leveling screws to support said plate on a pipe or other support with said plate horizontal, whereby said instrument is supported so that a laser beam is sighted down said pipe.

7. The combination of claim 6 which further comprises extensible means on said cylindrical column having a point to engage a surface of said pipe remote from said leveling screws.

8. The combination of claim 3 in which said support means comprises an expansion bar having feet at each end to grip the sides of a manhole or the like and a screw jack intermediate said feet and a second clamp to secure said cylindrical column and expansion bar together at right angles to each other, whereby said expansion bar may be secured to a manhole and said instrument to said cylindrical column remote from said expansion bar so that a laser beam is sighted down a pipe extending from said manhole.

9. The combination of claim 8 which further comprises a foot plate adapted to fit on the bottom of said manhole, first means to receive an end of said cylindrical column and second means for moving said first means toward and away from said foot plate to bow said expansion bar and jam said expansion bar and cylindrical column fixed relative to each other and to said manhole.

10. The combination of claim 8 which further comprises a target, means to hold said target in a pipe remote from said instrument, a strip of reflective material on said target and a mirror supported on said instrument, whereby a laser beam generated in said instrument is projected down said pipe to said target, back to said mirror and up said manhole to the eye of the user.

11. The combination of claim 3 which further comprises a locating collar, means for clamping said locating collar on said cylindrical column adjacent said clamp, said collar having a locating surface against which said instrument fits and a locating pin which engages said instrument to fix said collar and said clamp relative to each other, whereby when said locating collar is fixed to said cylindrical column with said locating surface flush against said instrument and said locating pin engaging said instrument and subsequently said clamp is removed from said cylindrical column and later replaced, said instrument is automatically aligned in the same position as prior to removal of said clamp.

12. A laser surveying instrument comprising a housing, a laser beam generator and collimator for extending a laser beam out of said housing, a clamp formed to clamp about a column or pipe, means connecting said housing and clamp together for controlled relative movement about a first horizontal axis, a bubble vial, a holder for said vial formed with a horizontally elongated slot, a pivot on said housing passing through said slot to define a second horizontal axis perpendicular to said vial at a first end of said vial, a micrometer fixed relative to said housing and connected to said vial at a second end opposite said first end, said micrometer having a barrel marked with percent-of-grade indicia to indicate the slope of said generator relative to the horizontal when said vial is horizontal, said micrometer having a stem projecting from said barrel, said stem being non-rotatable, said stem being pivotally connected to said holder at said second end of said vial, said stem movable solely along the axis of said micrometer, whereby as said vial pivots about said second horizontal axis said vial moves angularly above and below the optic axis of the laser beam.

* * * * *